US006444891B1

(12) United States Patent
Koo

(10) Patent No.: US 6,444,891 B1
(45) Date of Patent: Sep. 3, 2002

(54) ELECTRONIC GUITAR WITH ITS KEYS ARRANGED IN COMPLEX ARRAY

(76) Inventor: Po Wo Koo, 2nd Floor, No. 185, Shau Kei Wan Road, Hong Kong (HK)

(*) Notice: Subject to any disclaimer, the term of this patent is extended or adjusted under 35 U.S.C. 154(b) by 0 days.

(21) Appl. No.: 09/829,194

(22) Filed: Apr. 9, 2001

(30) Foreign Application Priority Data

Nov. 9, 2000 (CN) .................................... 00 2 55396 U

(51) Int. Cl.[7] .......................... G09B 15/04; G10H 1/22; G10H 5/00

(52) U.S. Cl. ............................ 84/684; 84/702; 84/719; 84/722; 84/478; 84/DIG. 2; 84/DIG. 30

(58) Field of Search ...................... 84/267, 293, 314 R, 84/314 N, 477 R, 478, 644, 646, 670, 719, 720, 722, 744, 745, DIG. 30, 618, 656, 684, DIG. 2, 702, 703

(56) References Cited

U.S. PATENT DOCUMENTS

| | | | | | |
|---|---|---|---|---|---|
| 3,340,343 | A | * | 9/1967 | Woll | 84/722 X |
| 3,541,912 | A | * | 11/1970 | Radke | 84/722 X |
| 3,555,166 | A | * | 1/1971 | Gasser | 84/722 X |
| 4,570,521 | A | * | 2/1986 | Fox | 84/DIG. 30 |
| 4,807,509 | A | * | 2/1989 | Graham | 84/314 R |
| 6,284,961 | B1 | * | 9/2001 | Kimmel | 84/478 |

* cited by examiner

*Primary Examiner*—Stanley J. Witkowski
(74) *Attorney, Agent, or Firm*—Jordan and Hamburg LLP

(57) ABSTRACT

Electronic guitar including a case, a keyboard, a sound synthesis electronic assembly and an output line. The keyboard is divided into an upper keyboard arranged on a neck of the case and a lower keyboard arranged on a body of the case. The upper and lower keyboards constitute a complex array. When a key on the upper keyboard and a key on the lower keyboard are pressed, a determined note is generated by the sound synthesis electronic assembly and can be output to a karaoke CD player. It is thus possible to play this guitar while singing the karaoke.

16 Claims, 9 Drawing Sheets

| column / row | 甲/1 | 乙/2 | 丙/3 | 丁/4 | 戊/5 |
|---|---|---|---|---|---|
| 紅 R | $\underset{\cdot}{6}$ | $\underset{\cdot}{7}$ | 1 | 2 | $\underset{\cdot}{2}$ |
| 綠 G | 3 | 4 | 5 | 6 | $\underset{\cdot}{3}$ |
| 藍 B | 7 | $\dot{1}$ | $\dot{2}$ | $\dot{3}$ | $\underset{\cdot}{4}$ |
| 黃 Y | $\dot{4}$ | $\dot{5}$ | $\dot{6}$ | $\underset{\cdot}{5}$ | $\dot{7}$ |

FIG.3

| row \ column | K1 | K2 | K3 | K4 | K5 | D1 | D2 |
|---|---|---|---|---|---|---|---|
| R | $\underset{\cdot}{2}$ | $\underset{\cdot}{3}$ | $\underset{\cdot}{4}$ | $\underset{\cdot}{5}$ | $\underset{\cdot}{6}$ | drum (1) | drum (5) |
| G | $\underset{\cdot}{7}$ | 1 | 2 | 3 | 4 | drum (2) | cymbal (1) |
| B | 5 | 6 | 7 | $\dot{1}$ | $\dot{2}$ | drum (3) | cymbal (2) |
| Y | $\dot{3}$ | $\dot{4}$ | $\dot{5}$ | $\dot{6}$ | $\dot{7}$ | drum (4) | cymbal (3) |

ELECTRONIC GUITAR WITH ITS KEYS ARRANGED IN COMPLEX ARRAY

BACKGROUND OF THE INVENTION

The present invention relates to a guitar, especially to an electronic guitar.

Karaoke CD players are very popular now. However, it is a little dull only to sing with a karaoke CD player. If the earphone socket of an electronic organ is connected to one of the microphone sockets of the karaoke CD player, it will be possible to play the electronic organ while singing. It is however very difficult to watch the screen while reading the music book. Therefore, it has been considered to add a line of color numbered notes under the lyric on the screen of the CD. Since the accompanying music is provided by the CD, the electronic organ can be simplified to an electronic guitar. Furthermore, commonly used musical scale is arranged in very simple layout, so the user can play almost all the music pieces of the world only with three fingers, i.e., the index finger, the middle finger and the ring finger, of the left hand and four fingers, i.e., the thumb, the index finger, the middle finger and the ring finger, of the right hand. Such a guitar is very desirable.

SUMMARY OF THE INVENTION

An object of this invention is to provide an electronic guitar of novel and simple structure, which can be used with a karaoke CD player. After the output plug of the electronic guitar is inserted into the input socket of the karaoke CD player, the played music pieces can be reproduced by the karaoke CD player.

In order to achieve the above object, the present invention provides a complex array electronic guitar comprising a case 1, a keyboard 2, a sound synthesis electronic assembly 3, and an output line 4. The keyboard 2 is divided into an upper keyboard 2-1 and a lower keyboard 2-2, each for one hand to strike. The upper keyboard 2-1 and the lower keyboard 2-2 include at least two keys respectively. The keys on the upper keyboard 2-1 and the keys on the lower keyboard constitute a complex array layout. When a key on the upper keyboard 2-1 and a key on the lower keyboard 2-2 are pressed, a predetermined note is generated by the sound synthesis electronic assembly 3 connected with the keyboard 2 and is output through the output line 4. Thus, the guitar according to the present invention achieves the above object. Usually, the upper keyboard 2-1 is disposed on the neck 1-1 of the case 1, and the lower keyboard 2-2 is disposed on the body 1-2 of the case 1.

The complex array electronic guitar according to the present invention has a simple and novel structure, and can be used very well with a karaoke CD player or used independently. This enables the karaoke to be accompanied by the guitar, which makes the effects produced by the karaoke even better.

BRIEF DESCRIPTION OF THE DRAWINGS

The advantages and features of the present invention will become more apparent from the following embodiments described in conjunction with the figures in which:

FIG. 3 is a diagram of the predetermined notes of the 4×5 complex array of the electronic guitar according to an embodiment of the present;

DETAILED DESCRIPTION OF THE INVENTION

Now, detailed description will be given to the complex array electronic guitar according to the present invention in conjunction with the figures.

Figure 1:
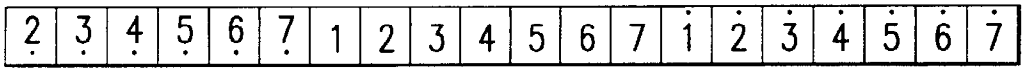
FIG. 1 is a diagram of the 20 notes to be included in the electronic guitar according to an embodiment of the present invention.

FIG. 1 shows the 20 notes from "2" to "7" included in the electronic guitar according to the present invention. It is enough for normal uses, be can also be adjusted by increasing or reducing the number of notes. For example, halftones may be further added. This is only an example to show that the electronic karaoke guitar can include a plurality of notes.

In addition, FIG. 1 also shows the layout of the keys on the keyboard of the conventional electronic guitar, which belongs to the prior art. The keyboard according to the present invention is remarkably different from it.

Figure 2:
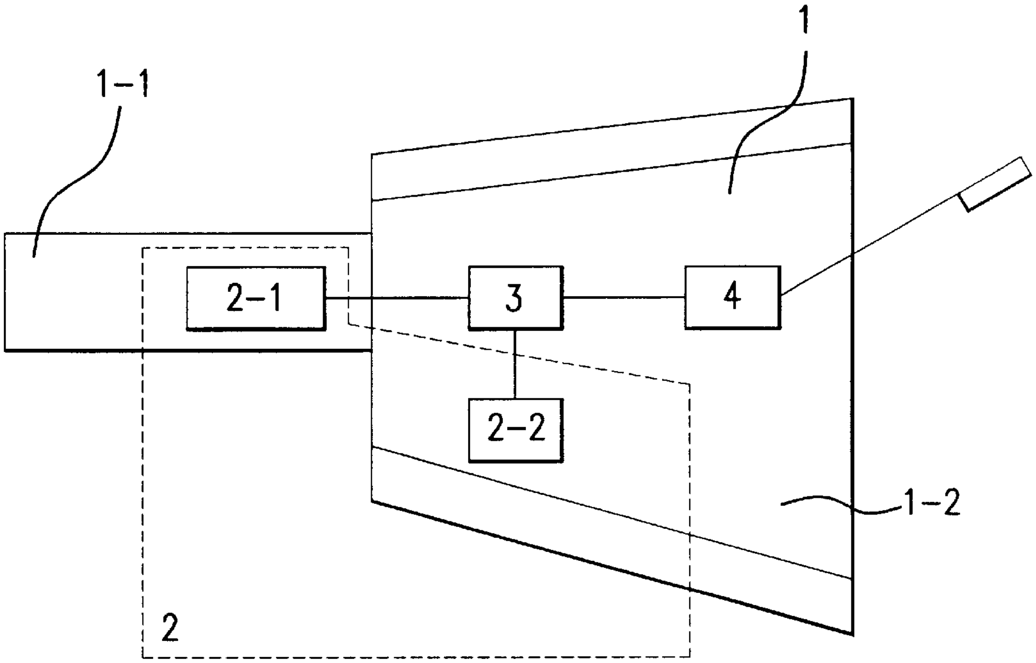
FIG. 2 is a diagram of the structure of the electronic guitar according to the present invention.

FIG. 2 is a diagram of the structure of the electronic guitar according to the present invention. The electronic karaoke guitar according to the present invention mainly comprises a case 1 and other electronic components all mounted on the case 1. The case 1 is shaped like a guitar including a long thin neck 1-1 and a bulgy body 1-2. When the body of the electronic guitar is provided with a speaker, the resonance factor must be taken into consideration. The electronic components include a keyboard 2, a sound synthesis electronic assembly 3, and an output line 4, wherein the keyboard 2 is connected with the sound synthesis electronic assembly 3, and the output line 4 is also connected with the sound synthesis electronic assembly 3, for the sound generated by the sound synthesis electronic assembly 3 to be output. As described above, the keyboard 2 is divided into the upper keyboard 2-1 and the lower keyboard 2-2 connected to the sound synthesis electronic assembly 3 respectively. The sound synthesis electronic assembly 3 includes electronic devices such as ICs.

FIG. 3 is a diagram of the concrete layout of the notes determined by the 4×5 complex array of the electronic karaoke guitar according to the present invention. The keys adopt the array layout according to the present invention which is by far advantageous over the linear array and can obtain the desired number of notes with less keys. The 4×5 complex array shown in FIG. 3 includes 20 notes. In the case of the linear array M×1, 20×1+1=21 keys would be necessary. Therefore, the key layout of the M×N complex array is much advantageous. The left side of FIG. 3 shows the four keys on the upper keyboard 2-1 identified by Red, Green, Blue and Yellow, and represents the row of the complex array 1 ("the array 1" for short). The upper line of FIG. 3 shows the five keys on the lower keyboard 2-2 with the Chinese characters "甲", "", "丙", "丁" and "戊" (which used as the ordinal numerals "first" to "fifth" in Chinese) and/or the numbers "1", "2", "3", "4", and "5", and represents the column of the array 1. The middle shows the notes determined by the cells where the rows and the columns intersect. For example, the note determined by row 1 column 3 is "1", and the note determined by row 2 column 1 is "3". The 4×5 array 1 determines 20 notes from "2" to "7". When a row key and a column key are pressed, the note in the intersected cell is generated and reproduced.

Figure 4:
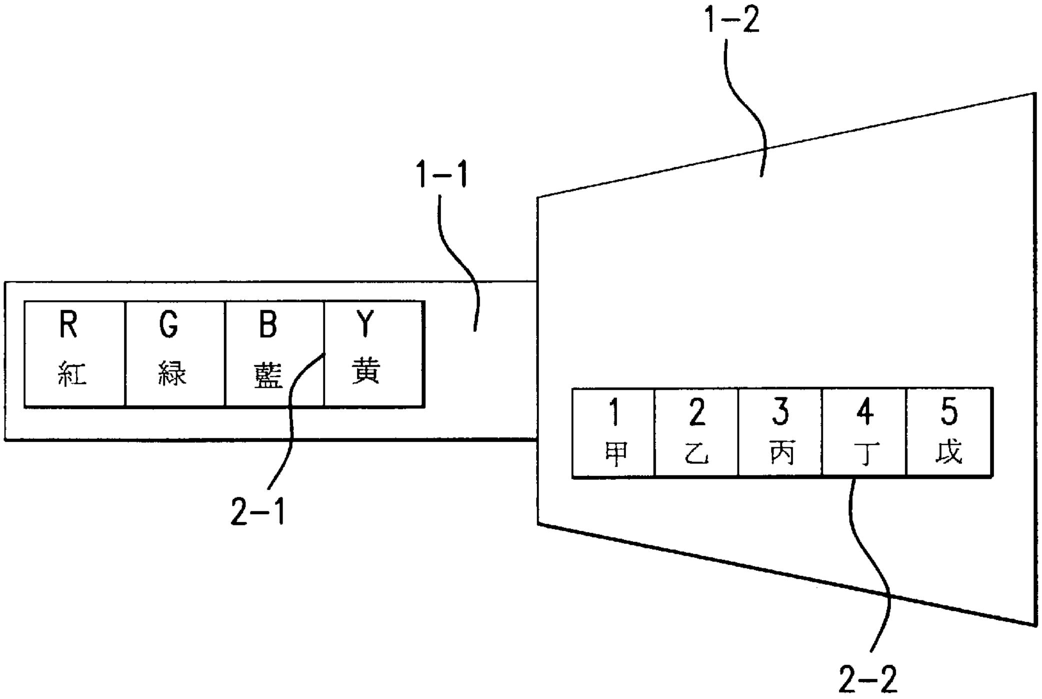
FIG. 4 is a diagram showing the appearance of the electronic guitar according to the first embodiment of the present invention.

FIG. 4 is a diagram showing the appearance of the electronic karaoke guitar according to the first embodiment of the present invention. The upper keyboard 2-1 is on the neck 1-1 of the case 1, and the lower keyboard 2-2 is on the body 1-2 of the case 1. The upper keyboard 2-1 includes four keys identified by the Chinese characters "紅"(Red), "綠"(Green), "藍"(Blue), and "黃"(Yellow) and/or by R, G, B, and Y which are the first letters of the English words "Blue", "Green", "Blue" and "Yellow", as shown in FIG. 3. The lower keyboard 2-2 may include five keys identified by the Chinese characters "甲", "", "丙", "丁" and "戊" and/or the corresponding numbers "1", "2", "3", "4", and "5".

When the lower keyboard 2-2 includes five keys, the notes to be generated are determined by the cells where the rows and the columns of array 1 intersect as shown in FIG. 3.

Figure 5:
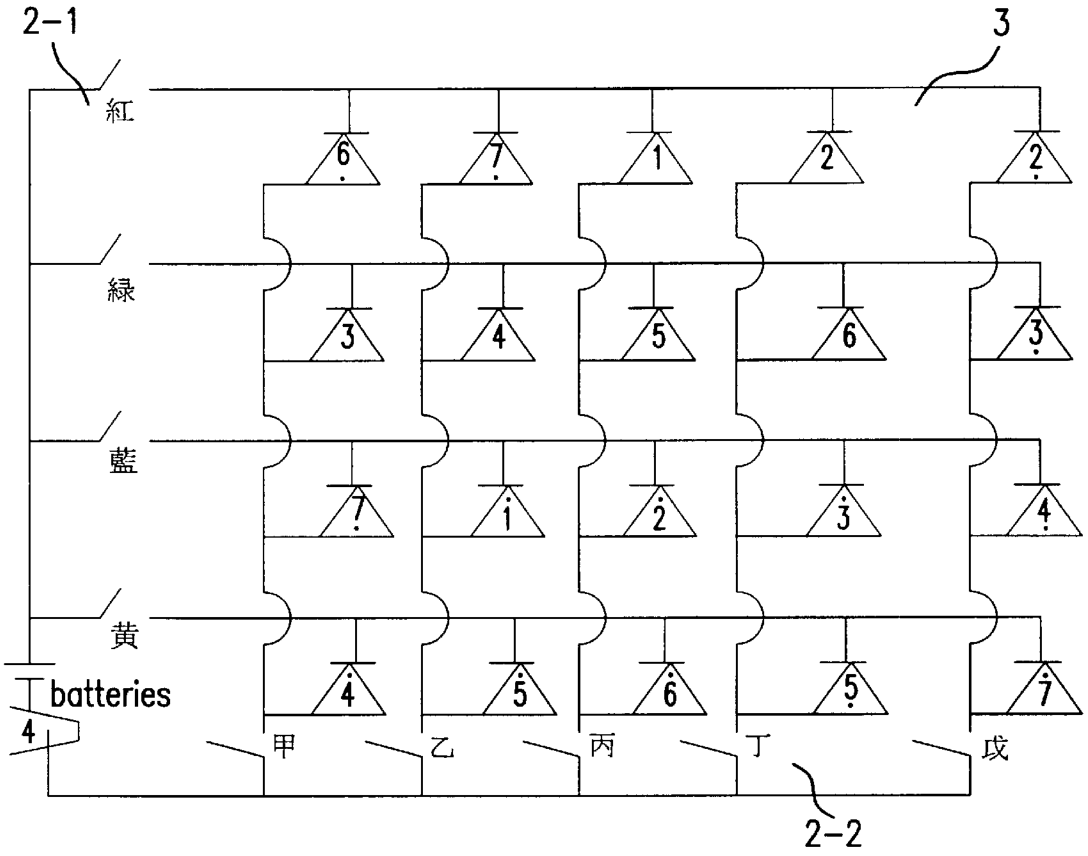
FIG. 5 is a circuit diagram of the sound synthesis electronic assembly generating a note by a row key and a column key of the electronic guitar according to the present invention.

FIG. 5 is a circuit diagram of the keyboard 2 and the sound synthesis electronic assembly 3 of the electronic karaoke guitar according to the present invention. Each triangle in FIG. 5 represents a note generated by an electronic generator which may be an IC. A large IC may also be used to include all the electronic generators represented by the triangles in FIG. 5. The left side of FIG. 5 shows the four keys on the upper keyboard 2-1, and the bottom shows the five keys on the lower keyboard. Each of the keys is actually a switch powered by the batteries at the left. Only when a key on the upper keyboard 2-1 is pressed (the switch is turned ON) and a key on the lower keyboard 2-2 is pressed (the switch is turned ON), can the corresponding circuit be connected. The note represented by the triangle of the connected circuit will be output through the output line 4, for example to the input socket of the karaoke CD player. The note can be reproduced by the sound amplifying unit of the karaoke CD player. When notes are consecutively reproduced, they become the played music piece.

Figure 6:
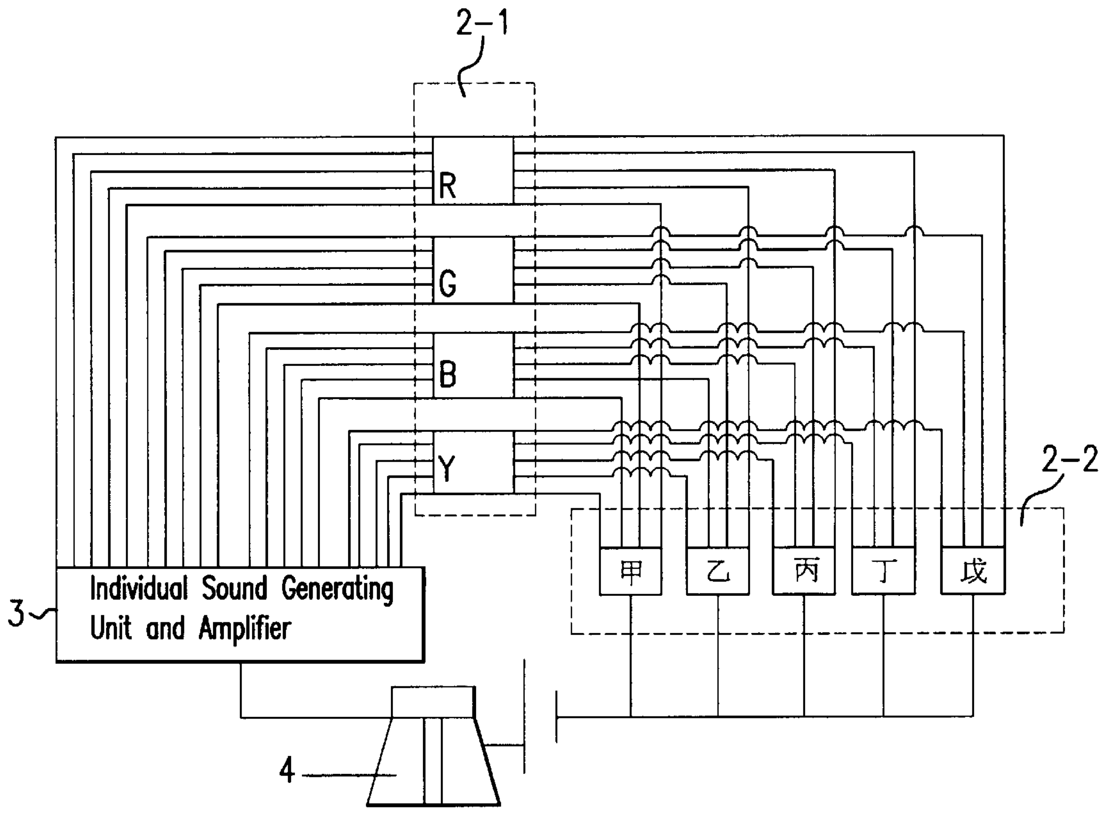
FIG. 6 is a circuit diagram of another sound synthesis electronic assembly generating a note by a row key and a column key of the electronic guitar according to the present invention.

FIG. 6 is a circuit diagram of another form of sound synthesis electronic circuit of the electronic guitar according to the present invention. The principle is the same as that of FIG. 5, but the layout of the components may be different. The upper keyboard 2-1 at the middle left side of FIG. 6 includes four keys identified by "R"(紅), "G"(綠), "B"(藍), and "Y"(黃) respectively. The right lower side of FIG. 6 shows the lower keyboard 2-2 including five keys identified by the characters "甲", "", "丙", "丁" and "戊". All these keys are also switches. Only when a key on the upper keyboard 2-1 and a key on the lower keyboard 2-2 are both pressed, can the corresponding circuit be connected, and accordingly, can the note on that circuit be generated and amplified. The sound synthesis electronic assembly 3 of the sound generating and amplifying circuit is shown at the left bottom side of FIG. 6. The sound is output through the connected output line 4.

Figure 7:
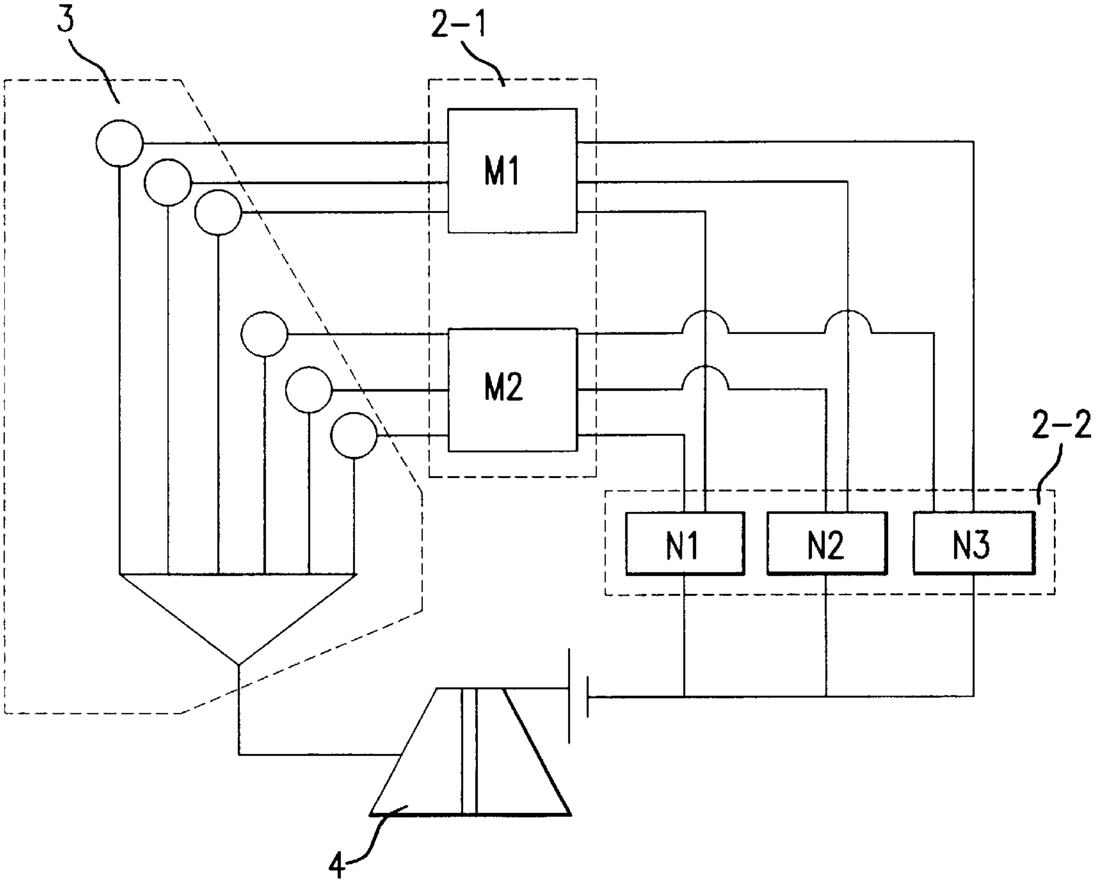
FIG. 7 is a circuit diagram of the basic exemplary 2×3 complex array for sound synthesis of the electronic guitar according to the present invention.

FIG. 7 is a circuit diagram of the basic exemplary complex array of the upper keyboard 2-1 and the lower keyboard 2-2 of the electronic guitar according to the present invention. In FIG. 7, M1, M2 etc. represent the keys on the upper keyboard 2-1, and N1, N2, N3 etc. represent the keys on the lower keyboard 2-2. Although only two M keys and three N keys are shown in FIG. 7, M and N each may be expanded to ten or more, with the structure of the electronic circuit shown in FIG. 7 unchanged. Sounds are still generated and amplified by the sound synthesis electronic assembly 3, and output through the connected output line 4. The product M×N of the number M of the keys on the upper keyboard 2-1 and the number N of the keys on the lower keyboard 2-2 is the number of the available notes. When M and N are both 10, as much as 100 notes will be available, and this is comparable with the number of keys on a grand piano. M and N may both be more than 10, for example, 13, thus 169 notes will be available. If M is 13 and N is 20, 260 notes will be available, which is comparable with a super grand piano. Therefore, the value of M and N can be determined as required. Thus, the electronic guitar with its keys arranged in complex array according to the present invention can obtain unexpected good effects.

In FIG. 7, the keys on the upper keyboard and the lower keyboard are circuit switches which are turned ON when pressed and otherwise be turned OFF. The small circles at the left side of FIG. 7 represent note generating devices, and the triangles at the left lower side represent the amplifiers for amplifying the notes. Such a guitar is usually powered by batteries, but can also be powered by a power source obtained by voltage reduction and rectification from the mains supply.

With this layout of the M×N complex array, in the electronic circuit of the sound synthesis electronic assembly 3, there are N input lines and N output lines for each key (Mx) on the upper keyboard 2-1, and M input lines and one output line for each key (Nx) on the lower keyboard 2-2.

Figures 8, 9:
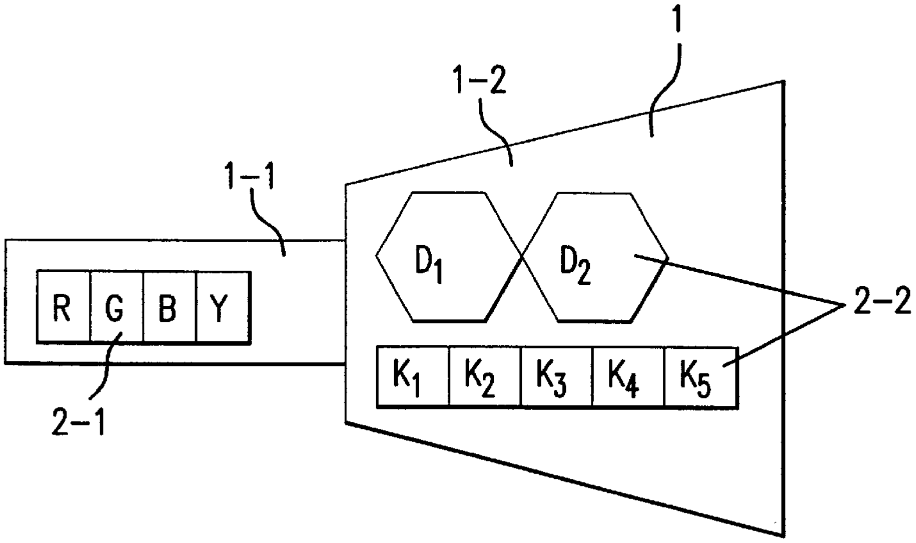
FIG. 8 is a diagram of the predetermined notes of the 4×7 complex array of the electronic guitar according to the present invention.
FIG. 9 is a diagram showing the appearance of the electronic guitar with a 4×7 complex array according to the second embodiment of the present invention.

FIG. 8 is a diagram of a complex array 2 adopted by the electronic karaoke guitar according to the second embodiment of the present invention. As compared with the array 1 in FIG. 3, the array 2 adds two columns of eight sounds including five kinds of drum sounds and three kinds of cymbal sounds, which are the right number of 5 drums and 3 cymbals in a set. Since the drums and the cymbals are usually not struck at the same time, there will be no problem to arrange the drums and the cymbals into two columns.

The complex array in FIG. 8 is 4×7, wherein 7 corresponds to seven keys on the lower keyboard 2-2. As shown in FIG. 8, the symbols "K1", "K2", "K3", "K4", "K5", "D1", and "D2" may be printed on the corresponding surfaces of the keys. Other aspects are similar to FIG. 3 but the detailed correspondence may be different.

FIG. 9 is a diagram showing the appearance of the electronic guitar with the 4 7 complex array 2 according to the second embodiment of the present invention. The layout of the upper keyboard 2-1 is similar to that of the guitar according to the first embodiment in FIG. 4. As to the layout of the lower keyboard 2-2, the key D1 and the key D2 in the form of big keys are disposed in the middle of the surface of the body 1-2 of the case 1 for the convenience of striking and pressing.

Figure 10:
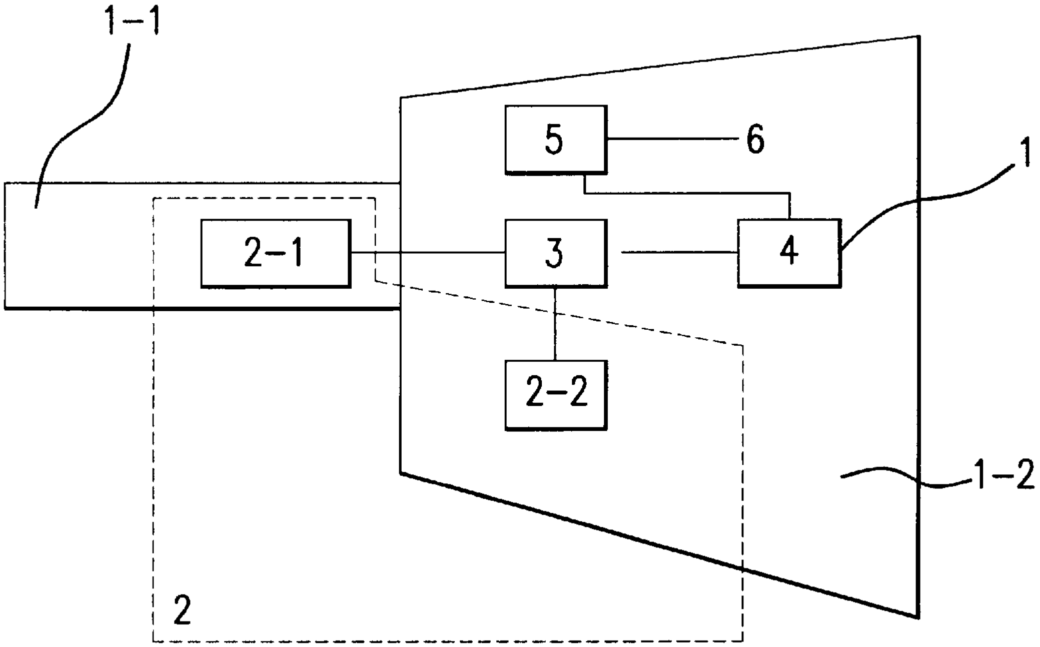
FIG. 10 is a diagram of the structure of the electronic guitar according to the present invention to which an amplifying unit and a speaker is added.

Referring now to FIG. 10, as compared with the guitar shown in FIG. 2, the guitar shown in FIG. 10 adds an amplifying unit 5 and a speaker 6. Since the guitar can be an independent musical instrument by itself, the added amplifying unit 5 and speaker 6 enable the guitar to be used independently, so as to broaden its usage. As shown in FIG. 10, one side of the amplifying unit 5 is connected with the speaker 6 and the other side is connected with the output line 4. The generated notes are sent through the speaker 6 to the amplifying unit 5 for the signal to be amplified so as to drive the speaker 6 which reproduces the notes. When connected to the karaoke player, the amplifying unit 5 and the speaker are disconnected not to be used. When not connected to the karaoke player, the guitar can be used independently.

Figure 11:
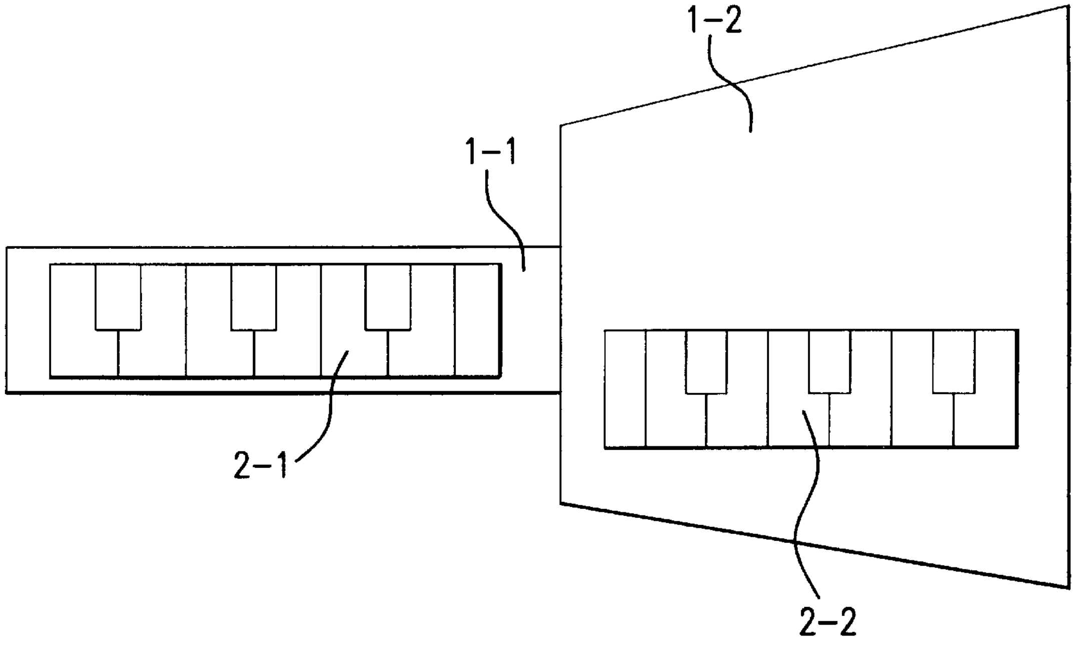
FIG. 11 is a diagram showing the appearance of the electronic guitar with a 10×10 complex array according to the third embodiment of the present invention.

FIG. 11 is a diagram showing the appearance of the electronic guitar with a 10×10 complex array according to the third embodiment of the present invention. The upper and lower keyboards are each provided with 10 keys, altogether 20 keys. The keys adopt the structure of normal piano keys. That is, each keyboard is provided with seven whole tones and three half tones. If the guitar is laid flat, it will become a guitar with 20 keys. The upper keyboard 2-1 may have the structure of normal piano keys. The lower keyboard 2-2 may also have the structure of normal piano keys. The number of keys may be increased. Since notes are generated by a row key and a column key of the complex array, 100 notes may be played. With rearranged music scores, this guitar can replace a standard grand piano. The player can easily play all the music pieces only with two hands shifting on two keyboards.

What is claimed is:

1. An electronic guitar, comprising:

a case;

a keyboard;

a sound synthesis electronic assembly; and an output line, said keyboard being divided into an upper keyboard and a lower keyboard, each for one hand to strike;

each of said upper keyboard and said lower keyboard including at least two keys;

said keys on said upper keyboard and said keys on said lower keyboard constituting a complex array in which each of said keys in said lower keyboard has a single input and a number of outputs equal to the number of keys in said upper keyboard and each of said keys in said upper keyboard has a number of inputs equal to the number of keys in said lower keyboard and a number of outputs equal to the number of keys in said lower keyboard such that a total number of notes generated by said array is equal to the product of the number of keys in said upper keyboard times the number of keys in said lower keyboard;

whereby when a key on said upper keyboard and a key on said lower keyboard are pressed, a predetermined note is generated by said sound synthesis electronic assembly and output through said output line.

2. The electronic guitar of claim 1, wherein said upper keyboard is arranged on a neck said case and said lower keyboard is arranged on a body of said case.

3. The electronic guitar of claim 1, further comprising an amplifier and a speaker which enable the guitar to be used independently.

4. The electronic guitar of claim 1, further comprising 20 notes.

5. The electronic guitar of claim 1, wherein said sound synthesis electronic assembly to generate 5 kinds of drum sounds and 3 kinds of cymbal sounds.

6. The electronic guitar of claim 1, wherein the number of said keys on said upper keyboard is greater than 10, and the number of said keys on said lower keyboard is greater than 10.

7. The electronic guitar of claim 1, wherein said upper keyboard has the structure of piano keys, and said lower keyboard also has the structure of piano keys.

8. The electronic guitar of claim 1, wherein said upper keyboard includes four keys identified by at least one of Chinese characters for the colors red, green, blue and yellow and the letters R, G, B, and Y, which are the first letters of the English words red, green, blue and yellow.

9. The electronic guitar of claim 1 or 8, wherein said lower keyboard includes seven keys identified by the symbols “K1”, “K2”, “K3”, “K4”, “K5”, “D1”, and “D2” printed on their surfaces.

10. The electronic guitar of claim 1 or 8, wherein said lower keyboard includes five keys identified by at least one of the Chinese characters for the numbers 1, 2, 3, 4and 5 and the numbers 1, 2, 3, 4 and 5.

11. The electronic guitar of claim 1 or 8, wherein said lower keyboard includes five keys and the generated note is determined by the cells where the rows and the columns of said array intersect, the rows of said array include keys on said upper keyboard and the columns of said array include keys on said lower keyboard.

12. The electronic guitar of claim 1 or 2, wherein said lower keyboard includes seven keys and the generated note is determined by the cells where the rows and the columns of said array intersect, the rows of said array include keys on said upper keyboard identified by at least one of Chinese characters for the colors red, green, blue and yellow and the letters R, G, B, and Y, and the columns of said array include keys on said lower keyboard identified by the symbols “K1”, “K2”, “K3”, “K4”, “K5”, “D1”, and “D2”.

13. The electronic guitar of claim 1, wherein said keys in said upper keyboard include percussion keys for generating percussion sounds such that the percussion sounds are generated only upon depression of one of said percussion keys and one of said keys in said lower keyboard.

14. The electronic guitar of claim 1, wherein said upper keyboard includes percussion keys for generating drum and/or cymbal sounds such that the percussion sounds and guitar sounds are both generated by depression of one of said keys in said upper keyboard.

15. The electronic guitar of claim 1, wherein said of said keys in said upper keyboard and each of said lower keyboard constitute a circuit switch having an ON position when depressed and an OFF position otherwise.

16. The electronic guitar of claim 1, wherein said upper keyboard includes percussion keys for generating drum and/or cymbal sounds such that the percussion sounds and guitar sounds are not simultaneously activatable with sounds produced by other keys of said upper keyboard.

* * * * *